United States Patent
Lehman

(10) Patent No.: US 9,428,720 B2
(45) Date of Patent: Aug. 30, 2016

(54) MINI-KEG GROWLER

(71) Applicant: Deep Wood Brew Products, LLC, Rochester, MI (US)

(72) Inventor: Kevin Lehman, Rochester, MI (US)

(73) Assignee: Deep Wood Brew Products, LLC, Holly, MI (US)

( * ) Notice: Subject to any disclaimer, the term of this patent is extended or adjusted under 35 U.S.C. 154(b) by 120 days.

(21) Appl. No.: 14/075,563

(22) Filed: Nov. 8, 2013

(65) Prior Publication Data

US 2015/0128810 A1    May 14, 2015

(51) Int. Cl.
*C12C 13/10*    (2006.01)

(52) U.S. Cl.
CPC .................... *C12C 13/10* (2013.01)

(58) Field of Classification Search
CPC .............. F17C 1/12; F17C 3/02; B65D 1/02; B65D 7/045
USPC .......................................................... 99/276
See application file for complete search history.

(56) References Cited

U.S. PATENT DOCUMENTS

| | | |
|---|---|---|
| 296,564 A | 4/1884 | Hemje |
| 810,430 A | 1/1906 | Pfluger et al. |
| 944,378 A | 12/1909 | Pfluger et al. |
| D45,242 S | 2/1914 | Schulhoff |
| 1,986,061 A | 11/1935 | Hill |
| 2,035,004 A | 3/1936 | Van Ness |
| 2,224,364 A | 12/1940 | Welty |
| 2,712,886 A | 7/1955 | Young |
| 2,742,172 A * | 4/1956 | Biederman ............ B65D 45/24 215/354 |
| 3,115,263 A * | 12/1963 | Leslie-Smith ............... 215/12.1 |
| D205,750 S | 9/1966 | Cornelius |
| 3,426,931 A | 2/1969 | Jensen |
| D228,976 S | 10/1973 | Wilson |
| 3,869,391 A | 3/1975 | Kramer |
| 3,893,487 A * | 7/1975 | Engelking ...................... 138/89 |
| D244,850 S | 6/1977 | Wilson |
| 4,032,047 A | 6/1977 | Wilson |
| D246,698 S | 12/1977 | Morris |
| D250,468 S | 12/1978 | O'Banion |
| D279,267 S | 6/1985 | Morris |
| D286,319 S | 10/1986 | Mathis |
| 4,664,297 A | 5/1987 | Giovinazzi |
| 4,690,299 A * | 9/1987 | Cannon .................... 220/592.19 |
| 4,717,031 A * | 1/1988 | Hewson ....................... 215/384 |
| D305,601 S | 1/1990 | Hewson |
| D306,639 S | 3/1990 | Wills |
| 4,957,266 A | 9/1990 | Ellis |
| 4,981,233 A | 1/1991 | Scheurer |
| D320,559 S | 10/1991 | Olson |
| 5,129,534 A | 7/1992 | Dunn |
| 5,165,569 A | 11/1992 | Furuhashi et al. |

(Continued)

FOREIGN PATENT DOCUMENTS

CN    201330531456.7 S    11/2013

*Primary Examiner* — Tu B Hoang
*Assistant Examiner* — Erin McGrath
(74) *Attorney, Agent, or Firm* — BrooksGroup

(57) ABSTRACT

A number of variations may include a growler, which may include a cap that may include an a sealing means such as an o-ring, and a container defining a cavity and having a neck portion constructed and arranged to mechanically engage and sealing close the cavity when the cap is connected to the container. A method may include providing a growler, filling the growler with a fermentable liquid, sealing the growler, and fermenting the liquid within the sealed growler.

24 Claims, 1 Drawing Sheet

(56) References Cited

U.S. PATENT DOCUMENTS

| | | | |
|---|---|---|---|
| D334,332 S | 3/1993 | Massey | |
| D334,616 S | 4/1993 | Nimmo | |
| 5,203,181 A | 4/1993 | Brossia et al. | |
| D336,714 S | 6/1993 | Brossia et al. | |
| D344,242 S | 2/1994 | Weise et al. | |
| D362,990 S | 10/1995 | Losordo | |
| 5,469,985 A * | 11/1995 | Furuichi et al. | 220/632 |
| D374,959 S | 10/1996 | Mull | |
| 5,657,871 A * | 8/1997 | Waters et al. | 206/509 |
| 5,799,339 A | 9/1998 | Perry et al. | |
| D431,512 S | 10/2000 | Pink | |
| D497,283 S | 10/2004 | Groombridge | |
| D545,135 S | 6/2007 | Bodum | |
| D558,950 S | 1/2008 | Brans | |
| D568,450 S | 5/2008 | King, Jr. et al. | |
| D574,574 S | 8/2008 | Bax | |
| D621,915 S | 8/2010 | Fima | |
| D623,464 S | 9/2010 | Kusch et al. | |
| D623,887 S | 9/2010 | Kusch et al. | |
| 8,176,929 B1 | 5/2012 | Collins | |
| D661,544 S | 6/2012 | Enghard | |
| 8,196,768 B2 | 6/2012 | Wheaton | |
| D675,561 S | 2/2013 | Chou | |
| 8,371,469 B2 | 2/2013 | Takedutsumi et al. | |
| 8,398,123 B1 * | 3/2013 | Sorkin | E04C 5/10 285/369 |
| D708,945 S | 7/2014 | Jetmar | |
| D721,281 S | 1/2015 | Vella | |
| D723,370 S | 3/2015 | Medlin | |
| D735,436 S | 7/2015 | Lehman | |
| D752,839 S | 3/2016 | Lehman | |
| 2003/0023208 A1 | 1/2003 | Osypka et al. | |
| 2005/0115732 A1 | 6/2005 | Tu et al. | |
| 2006/0153661 A1 | 7/2006 | Flaig | |
| 2013/0032564 A1 | 2/2013 | Rosbach | |
| 2013/0264350 A1 | 10/2013 | Handlon et al. | |
| 2014/0197199 A1 | 7/2014 | Barron | |

* cited by examiner

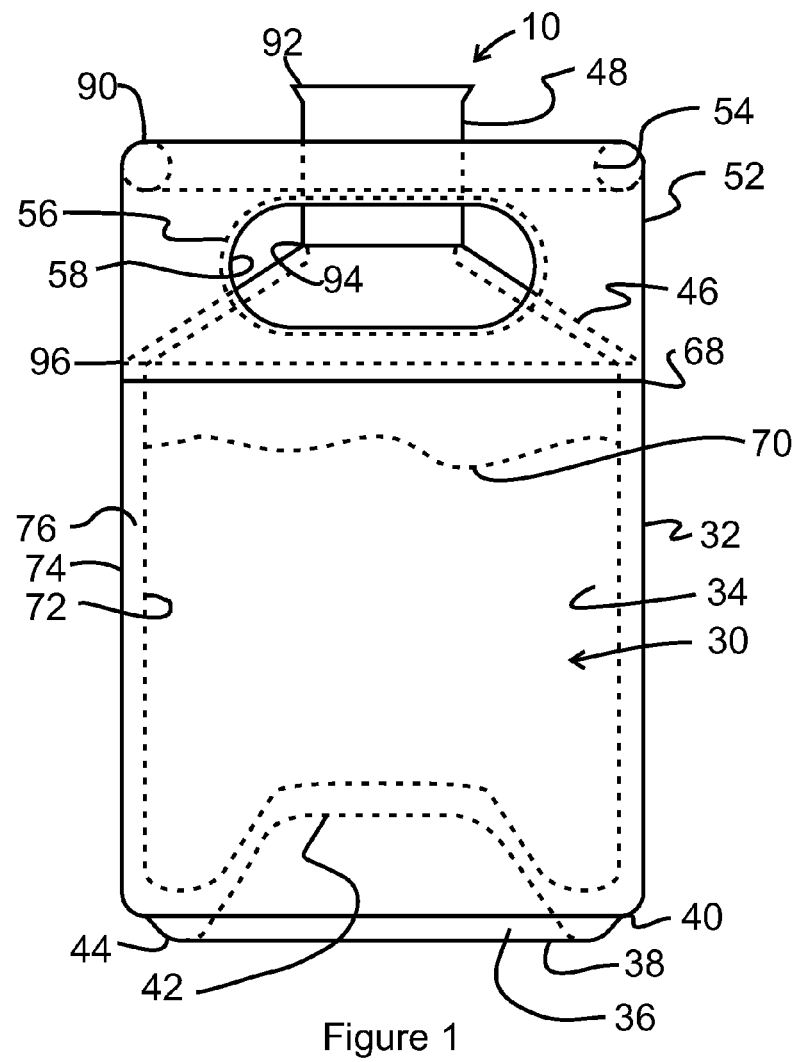
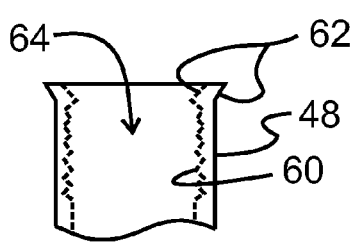
Figure 2
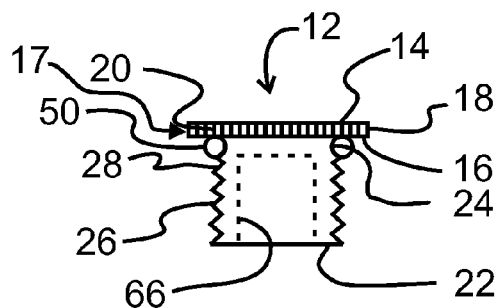
Figure 3
Figure 1

MINI-KEG GROWLER

TECHNICAL FIELD

The field to which the disclosure generally relates includes containers for holding fluids wherein the structure includes a sealing member acting at the junction of the closure and closure support or container mouth to oppose the passage of fluid there between.

BACKGROUND

Storage of carbonated liquids such as beer may include the use of a glass growler. Glass growlers temporarily hold the carbonation and temperature of a liquid but leak gas which may result in lost carbonation. Glass growlers are commonly rated for low internal pressures.

SUMMARY OF ILLUSTRATIVE VARIATIONS

In a number of variations, a product may include a first cap that may include an upper circular surface opposite a lower surface and spaced apart by a cylindrical side surface having a plurality of parallel striations disposed thereon, and a cap nipple extending from the lower surface of the first cap that may include a groove adjacent to the lower surface and outer threading on an outer surface of the cap nipple. An o-ring may be disposed within the groove. A first container may include a generally cylindrical body portion defining a first cavity and may include a closed end portion that may include a bottom surface defining a circular outer lip affixed to the generally cylindrical body portion to the closed end portion, an indent located generally at the center of the closed end portion, and a generally circular rib disposed there between, the first container further may include a conical portion extending opposite the closed end portion and converging toward and being affixed to a neck defining a passage in fluid communication with the first cavity and constructed and arranged to receive the first cap and sealingly close the cavity.

In a number of variations, a product may include a first cap that may include an upper circular surface opposite a lower surface and spaced apart by a cylindrical side surface having a plurality of parallel striations disposed thereon, and a cap nipple extending from the lower surface of the first cap that may include a groove adjacent to the lower surface and outer threading on an outer surface of the cap nipple. An o-ring may be disposed within the groove. A first container may include a generally cylindrical body portion defining a first cavity and that may include a closed end portion that may include a bottom surface defining a circular outer lip affixed to the generally cylindrical body portion to the closed end portion, an indent located generally at the center of the closed end portion, and a generally circular rib disposed there between. The first container further may include a conical portion extending opposite the closed end portion and converging toward and being affixed to a neck defining a passage in fluid communication with the first cavity and constructed and arranged to receive the first cap and sealingly close the cavity, wherein the neck may further include an inner threading within the passage constructed and arranged to thread and mechanically engage with the outer threading of the cap and a chamfered flange constructed and arranged to receive and engage the o-ring to sealingly close the cavity when the first cap is threaded with the neck. A collar may extend from the conical portion of the container and end at a first rolled lip and further may include a second rolled lip defining at least one through hole in the collar.

In a number of variations, a method may include providing a first cap that may include an upper circular surface opposite a lower surface and spaced apart by a cylindrical side surface having a plurality of parallel striations disposed thereon, and a cap nipple extending from the lower surface of the first cap may include a groove adjacent to the lower surface and outer threading on an outer surface of the cap nipple. An o-ring may be disposed within the groove. The method may further include providing a first container that may include a generally cylindrical body portion defining a first cavity and that may include a closed end portion that may include a bottom surface defining a circular outer lip affixed to the generally cylindrical body portion to the closed end portion, an indent located generally at the center of the closed end portion, and a generally circular rib disposed there between. The first container further may include a conical portion extending opposite the closed end portion and converging toward and being affixed to a neck defining a passage in fluid communication with the first cavity and constructed and arranged to receive the first cap and sealingly close the cavity. The method may further include providing a collar that may include a first rolled lip and a shoulder and further may include a second rolled lip defining at least one through hole in the collar. The method may further include attaching the shoulder of the collar to the cylindrical body portion at the interface of the cylindrical body portion and the conical portion.

A number of variations may include a product comprising: a first cap comprising an upper circular surface opposite a lower surface and spaced apart by a cylindrical side surface having a plurality of parallel striations disposed thereon, and a cap nipple extending from the lower surface of the first cap comprising a groove adjacent to the lower surface and outer threading on an outer surface of the cap nipple, and an o-ring disposed within the groove.

A number of variation may include a product comprising: a first container comprising a generally cylindrical body portion defining a first cavity and that includes a closed end portion comprising a bottom surface defining a circular outer lip affixed to the generally cylindrical body portion to the closed end portion, an indent located generally at the center of the closed end portion, and a generally circular rib disposed therebetween, the first container further comprising a conical portion extending opposite the closed end portion and converging toward and being affixed to a neck defining a passage in fluid communication with the first cavity and constructed and arranged to receive a first cap and sealingly close the cavity.

A number of variations may include a mini-keg growler container comprising a generally cylindrical body portion defining a first cavity and that includes a closed end portion comprising a bottom surface, the first container further comprising a portion extending opposite the closed end portion and to an elongated neck defining a passage in fluid communication with the first cavity and constructed and arranged to receive a first cap and sealingly close the cavity. Other illustrative variations within the scope of the invention will become apparent from the detailed description provided hereinafter.

It should be understood that the detailed description and enumerated variations, while disclosing optional variations, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 depicts a side view of a mini-keg growler;

FIG. 2 depicts a detail view of the neck of a mini-keg growler; and

FIG. 3 depicts a side view of a cap of a mini-keg growler.

DETAILED DESCRIPTION OF ILLUSTRATIVE VARIATIONS

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

The container may be made of stainless steel, aluminum, metal, metal alloy, other metallic material or other material suitable for use in high pressure vessels. The container may be constructed and arranged to hold a fluid or a pressurized fluid. According to a number of variations, the container may be formed from sheet metal or machined from a cast metal. The container may be constructed and arranged to fittingly stack onto or underneath another similar container. The container may be constructed and arranged to sealingly mate with the cap such that a cavity within the container is sealingly closed off from the exterior of the container.

The cap may be made of stainless steel, aluminum, metal, metal alloy, or other metallic material or other material suitable for use in high pressure vessels. According to a number of variations, the cap may be formed or machined from a cast metal. The cap may be constructed and arranged to sealingly mate with the cap such that a cavity within the container is sealingly closed off from the exterior of the container.

The o-ring may be made of a natural elastomeric material or a polymeric material having suitable material characteristics for use in high pressure vessels wherein the o-ring may be compressible such that it ensures a tight seal between a container and a cap. The o-ring may be disposed around a portion of the cap and constructed and arranged to facilitate a sealing connection between the cap and the container.

The container, cap, and o-ring may all be mutually constructed and arranged to contain a fluid at high pressure. According to one variation, a carbonated liquid such as beer may be disposed within the cavity of the container and the cap may sealingly close the container, thereby ensuring that the carbonated beverage does not lose carbonation. According to another variation, a fermentable liquid may be disposed within the cavity of the container and the cap may sealingly close the container. The fermentable liquid may then be fermented within the cavity of the container such that gases that may escape the fermentable liquid are held within the container and may carbonate the fermentable liquid within the container.

The container, cap, and o-ring may all be mutually constructed and arranged to contain a fluid at various temperatures and function to maintain the temperature of the fluid while within the container. With respect to FIG. 1; a product (10) may include a first container (30) that may include a generally cylindrical body portion (32) defining a first cavity (34) and that may include a closed end portion (36) that may include a bottom surface (38) defining a circular outer lip (40) affixed to the generally cylindrical body portion (32) of the closed end portion (36), an indent (42) located generally at the center of the closed end portion (36), and a generally circular rib (44) disposed there between. The first container (30) further may include a conical portion (46) extending opposite the closed end portion (36) and converging toward and being affixed to a neck (48). The container (30) may further include a collar (52) extending from the conical portion (46) and ending at a first rolled lip (54). The collar (52) may be affixed to the container (30) at a shoulder (68) of the container (30). The collar (52) may include a second rolled lip (56) that defines at least one through hole (58) within the collar (52). The at least one through hole (58) may be constructed and arranged to allow a user to lift the mini-keg growler. In a number of variations the container (30) may include a second inner wall (72) spaced apart from a first outer wall (74) and defining a third cavity (76) there between and constructed and arranged to improve thermal insulation within the container (30). In a number of variations the container (30) may be constructed and arranged to easily and efficiently stack with other similar containers (30). The container (30) may be constructed and arranged to hold a fermentable liquid or fluid (70) within the first cavity (34) and where the first cavity (34) may be sealed closed, and where the fluid (70) may then be fermented or pressurized or carbonated.

With respect to FIGS. 1 & 2; the neck (48) may define a passage (64) in fluid communication with the first cavity (34) and constructed and arranged to receive the first cap (12) and sealingly close the cavity (34). The neck (48) may further include an inner threading (60) within the passage (64) constructed and arranged to thread and mechanically engage with the outer threading (26) of the cap (12). The neck (48) may further include a chamfered flange (62) extending outwardly from the neck (48) at an angle of about 30 to 60 degrees from parallel with the neck (48). According to a number of variations, the chamfered flange (62) may extend outwardly from the neck (48) at an angle of about 45 degrees from parallel with the neck (48).

With respect to FIG. 3; a first cap (12) that may include a head (17) that may include an upper circular surface (14) opposite a lower surface (16) and spaced apart by a cylindrical side surface (18) having a plurality of parallel striations (20) disposed thereon, and a cap nipple (22) extending from the lower surface (16) of the first cap (12) that may include a groove (24) adjacent to the lower surface (16) and outer threading (26) on an outer surface (28) of the cap nipple (22), and an o-ring (50) disposed within the groove (24). The cap (12) may also define a second cavity (66) within the cap nipple (22).

The mini-keg growler may be smaller than a typical keg (15.5 gallon vessel) used to contain a fluid such as beer at a predetermined pressure greater than the air pressure outside of the keg. In a number of non-limiting variations, the cylindrical body portion (32) of a mini-keg growler may have a diameter ranging from 4-6 inches, for example 5.0-5.25 inches; the cylindrical body height may range from 4-6 inches, for example 4 inches; the conical potion (46) may have a height from point 96 to 94 ranging from 1.25-1.75 inches, for example 1.75 inches; the indent (42) in the bottom of the mini-keg growler may have a depth from surfaces (38) to (42) ranging from 0.75-1.25 inches, for example 1.0 inches; the head (17) of the cap (12) may have a diameter ranging from 1.5-20 inches, for example 1.75 inches; the cap nipple (22) may have a diameter ranging from 1.0-1.5 inches, for example 1.25 inches; the neck (48) may have a height from point (94) to (92) ranging from 0.5-5.0 inches, for example 1.0 inches; the neck (48) may have an outer diameter ranging from 1.25-2.0 inches, for example 1.5 inches, and an inner diameter ranging from 0.75-1.75, for example 1.25 inches; and the neck (48) may extend above the top (90) of the first rolled lip (54) to point (92) a distance ranging from 0.01-4 inches, 0.25-0.75 inches, for example 0.625 inches.

Variation 1 may include a product may include a first cap that may include a head having an upper circular surface opposite a lower surface and spaced apart by a cylindrical side surface having a plurality of parallel striations disposed thereon, and a cap nipple extending from the lower surface of the first cap that may include a groove adjacent to the lower surface and outer threading on an outer surface of the cap nipple, and an o-ring disposed within the groove. A first container may include a generally cylindrical body portion defining a first cavity and that may include a closed end portion that may include a bottom surface defining a circular outer lip affixed to the generally cylindrical body portion to the closed end portion, an indent located generally at the center of the closed end portion, and a generally circular rib disposed there between. The first container further may include a conical portion extending opposite the closed end portion and converging toward and being affixed to a neck defining a passage in fluid communication with the first cavity and constructed and arranged to receive the first cap and sealingly close the cavity. In a number of variations the container may include a spaced apart second inner wall constructed and arranged to improve thermal insulation.

Variation 2 may include a product as set forth in variation 1 that further may include a collar extending from the conical portion of the container and ending at a first rolled lip and further may include a second rolled lip defining at least one through hole in the collar.

Variation 3 may include a product as set forth in any of variations 1 or 2 wherein the neck may further include an inner threading within the passage constructed and arranged to thread and mechanically engage with the outer threading of the cap; and a chamfered flange constructed and arranged to receive and engage the o-ring to sealingly close the cavity when the first cap is threaded with the neck.

Variation 4 may include a product as set forth in any of variations 1 through 3 wherein the chamfered flange extends outwardly from the neck at a predetermined angle ranging from about 30 to about 60 degrees from parallel with the neck.

Variation 5 may include a product as set forth in any of variation 4 wherein the predetermined angle ranges from about 40 to about 50 degrees from parallel with the neck.

Variation 6 may include a product as set forth in any of variations 4 through 5 wherein the predetermined angle may be about 45 degrees from parallel with the neck.

Variation 7 may include a product as set forth in any of variations 1 through 6 and further may include a second container and a second cap wherein the outer lip and circular rib of the first container are constructed and arranged to receive the first rolled lip of the collar of the second container such that the first container may be stacked upon the second container; and wherein the indent of the first container may be constructed and arranged to extend into the cavity such that the neck and second cap of the second container does not come into contact with the indent of the first container.

Variation 8 may include a product as set forth in any of variations 1 through 7 wherein the hub portion of the first cap may define a second cavity.

Variation 9 may include a product as set forth in any of variations 1 through 8 wherein the container and the cap may form a high pressure vessel.

Variation 10 may include a product as set forth in any of variation 9 wherein high pressure vessel may be constructed and arranged to withstand internal pressure ranging from about 0 PSI to about 50 PSI.

Variation 11 may include a product as set forth in any of variations 9 through 10 wherein high pressure vessel may be constructed and arranged to withstand internal pressure ranging from about 5 PSI to about 15 PSI.

Variation 12 may include a product as set forth in any of variations 1 through 11 wherein the container may include a double-wall configuration that may include an inner wall, an outer wall, and a third cavity defined there between and wherein the inner wall and the outer wall meet at the neck to sealingly separate the first cavity from the third cavity.

Variation 13 may include a product that may include a first cap that may include an upper circular surface opposite a lower surface and spaced apart by a cylindrical side surface having a plurality of parallel striations disposed thereon, and a cap nipple extending from the lower surface of the first cap may include a groove adjacent to the lower surface and outer threading on an outer surface of the cap nipple. An o-ring may be disposed within the groove; a first container may include a generally cylindrical body portion defining a first cavity and may include a closed end portion that may include a bottom surface defining a circular outer lip affixed to the generally cylindrical body portion to the closed end portion, an indent located generally at the center of the closed end portion, and a generally circular rib disposed there between. The first container further may include a conical portion extending opposite the closed end portion and converging toward and being affixed to a neck defining a passage in fluid communication with the first cavity and constructed and arranged to receive the first cap and sealingly close the cavity, wherein the neck further includes an inner threading within the passage constructed and arranged to thread and mechanically engage with the outer threading of the cap and a chamfered flange extending from the neck at a predetermined angle and may be constructed and arranged to receive and engage the o-ring to sealingly close the cavity when the first cap is threaded with the neck. A collar may extend from the conical portion of the container and end at a first rolled lip and further may include a second rolled lip defining at least one through hole in the collar.

Variation 14 may include a product as set forth in variation 13 wherein the predetermined angle ranges from about 30 to about 60 degrees from parallel with the neck.

Variation 15 may include a product as set forth in any of variations 13 through 14 wherein the predetermined angle may be about 45 degrees from parallel with the neck.

Variation 16 may include a product as set forth in any of variations 13 through 15 wherein the container and the cap form a high pressure vessel.

Variation 17 may include a product as set forth in any of variations 13 through 16 wherein high pressure vessel may be constructed and arranged to withstand internal pressure ranging from about 5 PSI to about 15 PSI.

Variation 18 may include a method providing a first cap that may include an upper circular surface opposite a lower surface and spaced apart by a cylindrical side surface having a plurality of parallel striations disposed thereon, and a cap nipple extending from the lower surface of the first cap may include a groove adjacent to the lower surface and outer threading on an outer surface of the cap nipple, and an o-ring disposed within the groove. The method may further include providing a first container may include a generally cylindrical body portion defining a first cavity and that may include a closed end portion that may include a bottom surface defining a circular outer lip affixed to the generally cylindrical body portion of the closed end portion, an indent located generally at the center of the closed end portion, and a generally circular rib disposed there between, the first container further may include a conical portion extending opposite the closed end portion and converging toward and being affixed to a neck defining a passage in fluid communication with the first cavity and constructed and arranged to receive the first cap and sealingly close the cavity. The method may further include providing a collar that may include a first rolled lip and a shoulder and further may include a second rolled lip defining at least one through hole in the collar. The method may further include attaching the shoulder of the collar to the cylindrical body portion at the interface of the cylindrical body portion and the conical portion.

Variation 19 may include a method as set forth in variation 18 further may include providing a fermentable liquid within the cavity, sealingly closing the cavity, and fermenting the fermentable liquid within the cavity.

Variation 20 may include a method as set forth in any of variations 18 through 22 that may further include providing a carbonated liquid within the cavity, sealingly closing the cavity, and pressurizing the cavity to an internal pressure ranging from about 5 PSI to about 15 PSI.

Variation 21 may include a product comprising: a first cap comprising an upper circular surface opposite a lower surface and spaced apart by a cylindrical side surface having a plurality of parallel striations disposed thereon, and a cap nipple extending from the lower surface of the first cap comprising a groove adjacent to the lower surface and outer threading on an outer surface of the cap nipple, and an o-ring disposed within the groove.

Variation 22 may include a product comprising: a first container comprising a generally cylindrical body portion defining a first cavity and that includes a closed end portion comprising a bottom surface defining a circular outer lip affixed to the generally cylindrical body portion to the closed end portion, an indent located generally at the center of the closed end portion, and a generally circular rib disposed there between, the first container further comprising a conical portion extending opposite the closed end portion and converging toward and being affixed to a neck defining a passage in fluid communication with the first cavity and constructed and arranged to receive a first cap and sealingly close the cavity.

Variation 23 may include a product including: a mini-keg growler container comprising a generally cylindrical body portion defining a first cavity and that includes a closed end portion comprising a bottom surface, the first container further comprising a portion extending opposite the closed end portion and to an elongated neck defining a passage in fluid communication with the first cavity and constructed and arranged to receive a first cap and sealingly close the cavity.

Variation 24 may include a product as set forth in variation 23 further comprising a first cap comprising an upper circular surface opposite a lower surface and spaced apart by a cylindrical side surface, and a cap nipple extending from the lower surface of the first cap comprising a groove adjacent to the lower surface and an o-ring disposed within the groove.

The above description of variations within the scope of the invention is merely demonstrative in nature and, thus, variations thereof are not to be regarded as a departure from the spirit and scope of the inventions disclosed within this document.

What is claimed is:

1. A mini-keg growler comprising:
   a first cap comprising an upper circular surface opposite a lower surface and spaced apart by a cylindrical side surface having a plurality of parallel striations disposed thereon, and a cap nipple extending from the lower surface of the first cap comprising a groove adjacent to the lower surface and outer threading on an outer surface of the cap nipple, and an o-ring disposed within the groove; and
   a first container comprising a generally cylindrical body portion defining a first cavity and that includes a closed end portion comprising a bottom surface defining a circular outer lip affixed to the generally cylindrical body portion of the closed end portion, an indent located generally at the center of the closed end portion, and a generally circular rib disposed therebetween, the first container further comprising a conical portion extending opposite the closed end portion and converging toward and being affixed to a neck defining a passage in fluid communication with the first cavity and constructed and arranged to receive the first cap and sealingly close the cavity wherein the container and the first cap form a high pressure vessel; and
   wherein the neck further comprises: an inner threading within the passage constructed and arranged to thread and mechanically engage with the outer threading of the cap; and a chamfered flange constructed and arranged to receive and engage the o-ring to sealingly close the cavity when the first cap is threaded with the neck so that the chamfered flange is fully and directly engaged with the o-ring disposed in the groove, and wherein the chamfered flange extends outwardly from an outer surface of the neck at a predetermined angle ranging from about 30 to about 60 degrees from parallel with the neck.

2. The mini-keg growler according claim 1, further comprising:
   a collar extending from the conical portion of the container and ending at a first rolled lip and further comprising a second rolled lip defining at least one through hole in the collar.

3. The mini-keg growler according claim 1, wherein the predetermined angle ranges from about 40 to about 50 degrees from parallel with the neck.

4. The mini-keg growler according claim 1, wherein the predetermined angle is about 45 degrees from parallel with the neck.

5. The mini-keg growler according claim 1, wherein the nipple of the first cap defines a second cavity.

6. The mini-keg growler according claim 1, wherein the high pressure vessel is constructed and arranged to withstand internal pressure ranging from about 5 PSI to about 15 PSI.

7. The mini-keg growler according claim 1, wherein the container comprises a double-wall configuration that includes an inner wall, an outer wall, and a third cavity defined there between and wherein the inner wall and the outer wall meet at the neck to sealingly separate the first cavity from the third cavity.

8. A mini-keg growler comprising:
a first cap comprising an upper circular surface opposite a lower surface and spaced apart by a cylindrical side surface having a plurality of parallel striations disposed thereon, and a cap nipple extending from the lower surface of the first cap comprising a groove adjacent to the lower surface and outer threading on an outer surface of the cap nipple, and an o-ring disposed within the groove;
a first container comprising a generally cylindrical body portion defining a first cavity and that comprises a closed end portion comprising a bottom surface defining a circular outer lip affixed to the generally cylindrical body portion of the closed end portion, an indent located generally at the center of the closed end portion, and a generally circular rib disposed therebetween, the first container further comprising a conical portion extending opposite the closed end portion and converging toward and being affixed to a neck defining a passage in fluid communication with the first cavity and constructed and arranged to receive the first cap and sealingly close the cavity, wherein the neck further comprises an inner threading within the passage constructed and arranged to thread and mechanically engage with the outer threading of the cap and a chamfered flange constructed and arranged to receive and engage the o-ring to sealingly close the cavity when the first cap is threaded with the neck so that the chamfered flange is fully and directly engaged with the o-ring disposed in the groove, wherein the high pressure vessel is constructed and arranged to withstand internal pressure to about 50 PSI, wherein the chamfered flange extends outwardly from an outer surface of the neck at a predetermined angle; and
a collar extending from the conical portion of the container and ending at a first rolled lip and further comprising a second rolled lip defining at least one through hole in the collar.

9. The mini-keg growler according claim 8, wherein the predetermined angle ranges from about 30 to about 60 degrees from parallel with the neck.

10. The mini-keg growler according claim 8, wherein the predetermined angle is about 45 degrees from parallel with the neck.

11. The mini-keg growler according claim 8, wherein the container and the cap form a high pressure vessel.

12. The mini-keg growler according claim 11, wherein the high pressure vessel is constructed and arranged to withstand internal pressure ranging from about 5 PSI to about 15 PSI.

13. A mini-keg growler comprising:
a mini-keg growler container comprising a generally cylindrical body portion defining a first cavity and that includes a closed end portion comprising a bottom surface comprising a truncated cone shaped indent located generally at the center of the closed end portion wherein the truncated cone shaped indent comprises a plateau located generally at the center of the closed end portion, the first container further comprising a portion extending opposite the closed end portion and to an elongated neck defining a passage in fluid communication with the first cavity, the neck comprising a chamfered flange constructed and arranged to receive and engage an o-ring to sealingly close the first cavity when a first cap is threaded with the neck so that the chamfered flange is fully and directly engaged with the o-ring disposed in the groove when the first cap is closed, and wherein the chamfered flange extends outwardly from an outer surface of the neck at a predetermined angle ranging from about 30 to about 60 degrees from parallel with the neck; and
the first cap comprising an upper circular surface opposite a lower surface and spaced apart by a cylindrical side surface, and a cap nipple extending from the lower surface of the first cap comprising a groove adjacent to the lower surface and the o-ring disposed within the groove.

14. A mini-keg growler as set forth in claim 13 wherein the cavity is about one gallon or less in volume.

15. A mini-keg growler comprising:
a first cap comprising an upper circular surface opposite a lower surface and spaced apart by a cylindrical side surface having a plurality of parallel striations disposed thereon, and a cap nipple extending from the lower surface of the first cap comprising a recessed groove adjacent to the lower surface and outer threading on an outer surface of the cap nipple, and an o-ring disposed within the groove; and
a first container comprising a generally cylindrical body portion defining a first cavity of about one gallon or less in volume and that includes a closed end portion comprising a bottom surface defining a circular outer lip affixed of the generally cylindrical body portion to the closed end portion, a truncated cone shaped indent located generally at the center of the closed end portion wherein the truncated cone shaped indent comprises a plateau located generally at the center of the truncated cone shaped and indent and the closed end portion, and a generally circular rib disposed therebetween, the first container further comprising a conical portion extending opposite the closed end portion and converging toward and being affixed to a neck defining a passage in fluid communication with the first cavity and a chamfered flange constructed and arranged to receive and engage an o-ring to sealingly close the cavity when the first cap is threaded with the neck so that the chamfered flange is fully and directly engaged with the o-ring disposed in the groove when the cap is closed.

16. A mini-keg growler comprising:
a first container comprising a generally cylindrical body portion defining a first cavity of about one gallon or less in volume and that comprises a closed end portion comprising a bottom surface defining a circular outer lip affixed to the generally cylindrical body portion of the closed end portion, an indent located generally at the center of the closed end portion, and a generally circular rib disposed therebetween, the first container further comprising a conical portion extending opposite the closed end portion and converging toward and being affixed to a neck defining a passage in fluid communication with the first cavity and constructed and arranged to receive a cap and sealingly close the cavity, wherein the neck further comprises an inner threading within the passage constructed and arranged to thread and mechanically engage with the cap and a chamfered flange constructed and arranged to receive and fully and directly engage an o-ring to sealingly close the cavity when the cap is threaded with the neck, and wherein the chamfered flange extends outwardly from an outer surface of the neck at a predetermined angle ranging from about 30 to about 60 degrees from parallel with the neck; and a collar extending from the conical portion of the container and ending at a first rolled lip and further comprising a second rolled lip defining at least one through hole in the collar.

17. A mini-keg growler comprising:

a first mini-keg growler container comprising a generally cylindrical body portion defining a first cavity and that comprises a closed end portion comprising a bottom surface defining a circular outer lip affixed to the generally cylindrical body portion of the closed end portion, and a collar connected to the body portion and having a shoulder and a first rolled lip and further comprising a second rolled lip defining at least one through hole in the collar, wherein the cavity is about one gallon or less in volume and further comprising a conical portion extending opposite the closed end portion and converging toward and being affixed to a neck, the neck comprising a chamfered flange constructed and arranged to receive and engage an o-ring to sealingly close the first cavity when a first cap is threaded with the neck so that the chamfered flange is fully and directly engaged with the o-ring disposed in the groove.

18. A mini-keg growler as set forth in claim 17 wherein the first container further comprises a conical portion extending opposite the closed end portion and converging toward and being affixed to a neck defining a passage in fluid communication with the first cavity and constructed and arranged to receive the first cap and sealingly close the cavity.

19. A mini-keg growler as set forth in claim 18 wherein the neck further comprises an inner threading within the passage constructed and arranged to thread and mechanically engage with an outer threading of the cap and a chamfered flange constructed and arranged to receive and engage an o-ring to sealingly close the cavity when the first cap is threaded with the neck.

20. A mini-keg growler as set forth in claim 17 wherein the generally cylindrical body portion formed therein an indent located generally at the center of the closed end portion.

21. A mini-keg growler comprising:

a first mini-keg growler container comprising a generally cylindrical body portion defining a first cavity and that comprises a closed end portion comprising a bottom surface defining a circular outer lip affixed to the generally cylindrical body portion of the closed end portion, wherein the first container further comprising a conical portion extending opposite the closed end portion and converging toward and being affixed to a neck comprising a chamfered flange defining a passage in fluid communication with the first cavity and constructed and arranged to receive a first cap comprising a cap nipple extending from a lower surface of the first cap comprising a recess groove adjacent to the lower surface on an outer surface of the cap nipple, and an o-ring disposed within the recessed groove and sealingly close the cavity wherein the cap depresses the o-ring against the chamfered flange, wherein the chamfered flange is fully and directly engaged with the o-ring, and a collar extending from the conical portion and having a shoulder and a first rolled lip and further comprising a second rolled lip defining at least one through hole in the collar, wherein the cavity is about one gallon or less in volume.

22. A mini-keg growler as set forth in claim 21, wherein the high pressure vessel is constructed and arranged to withstand internal pressure to about 50 PSI.

23. A mini-keg growler comprising:

a first cap comprising an upper circular surface opposite a lower surface and spaced apart by a cylindrical side surface, and a cap nipple extending from the lower surface of the first cap comprising a groove adjacent to the lower surface and outer threading on an outer surface of the cap nipple, and an o-ring disposed within the groove; and a first container comprising a generally cylindrical body portion defining a first cavity and that includes a closed end portion comprising a bottom surface defining a circular outer lip affixed to the generally cylindrical body portion of the closed end portion; and wherein the neck further comprises: an inner threading within the passage constructed and arranged to thread and mechanically engage with the outer threading of the cap; and a chamfered flange constructed and arranged to receive and engage the o-ring to sealingly close the cavity when the first cap is threaded with the neck so that the chamfered flange is fully and directly engaged with the o-ring disposed in the groove, and wherein the chamfered flange extends outwardly from an outer surface of the neck at a predetermined angle ranging from about 30 to about 60 degrees from parallel with the neck.

24. A mini-keg growler as set forth in claim 23 wherein an indent is located generally at the center of the closed end portion, and further comprising a generally circular rib disposed between the indent and the circular outer lip, the first container further comprising a conical portion extending opposite the closed end portion and converging toward and being affixed to a neck defining a passage in fluid communication with the first cavity and constructed and arranged to receive the first cap and sealingly close the cavity wherein the container and the first cap form a high pressure vessel.

* * * * *